(12) United States Patent
Parra et al.

(10) Patent No.: US 9,032,099 B1
(45) Date of Patent: May 12, 2015

(54) WRITEBACK MECHANISMS FOR IMPROVING FAR MEMORY UTILIZATION IN MULTI-LEVEL MEMORY ARCHITECTURES

(71) Applicants: Jorge E. Parra, El Dorado Hills, CA (US); Marc Torrant, Sacramento, CA (US); Joydeep Ray, Folsom, CA (US)

(72) Inventors: Jorge E. Parra, El Dorado Hills, CA (US); Marc Torrant, Sacramento, CA (US); Joydeep Ray, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/104,260

(22) Filed: Dec. 12, 2013

(51) Int. Cl.
 *G06F 3/06* (2006.01)
 *G06F 12/08* (2006.01)
 *G06F 13/38* (2006.01)
 *G06F 5/00* (2006.01)

(52) U.S. Cl.
 CPC .................................. *G06F 12/0804* (2013.01)

(58) Field of Classification Search
 None
 See application file for complete search history.

(56) References Cited

U.S. PATENT DOCUMENTS

2013/0275682 A1* 10/2013 Ramanujan et al. .......... 711/122

* cited by examiner

*Primary Examiner* — Scott Sun
(74) *Attorney, Agent, or Firm* — Lowenstein Sandler LLP

(57) ABSTRACT

Multi-level memory architecture technologies are described. One processor includes a requesting unit, a first memory interface to couple to a far memory (FM), a second memory interface to couple to a near memory (NM) and a multi-level memory controller (MLMC) coupled to the requesting unit, the first memory interface and the second memory interface. The MLMC is to write data into a memory page of NM in response to a request from the requesting unit to retrieve the memory page from FM. The MLMC receives a hint from the requesting unit and clears a writeback bit for the memory page indicated in the hint. The hint indicates that the data contained in the memory page of the NM is not to be subsequently requested by the requesting unit. The MLMC starts a writeback operation of a memory sector including the memory page and one or more additional memory pages. The writeback operation is to transfer the data contained in the memory page from the NM to the FM when the writeback bit is set and the writeback operation does is not to transfer the data contained in the memory page from NM to the FM when the writeback bit is cleared.

20 Claims, 12 Drawing Sheets

WRITEBACK MECHANISMS FOR IMPROVING FAR MEMORY UTILIZATION IN MULTI-LEVEL MEMORY ARCHITECTURES

Embodiments described herein generally relate to processing devices and, more specifically, relate to writeback mechanisms for improving far memory utilization in multi-level memory architectures and operating the same.

BACKGROUND

In computing, memory refers to the physical devices used to store programs (e.g., sequences of instructions) or data (e.g. program state information) on a temporary or permanent basis for use in a computer or other digital electronic devices. The terms "memory," "main memory" or "primary memory" can be associated with addressable semiconductor memory, i.e. integrated circuits consisting of silicon-based transistors, used for example as primary memory in computers.

DESCRIPTION OF EMBODIMENTS

Figure 1:
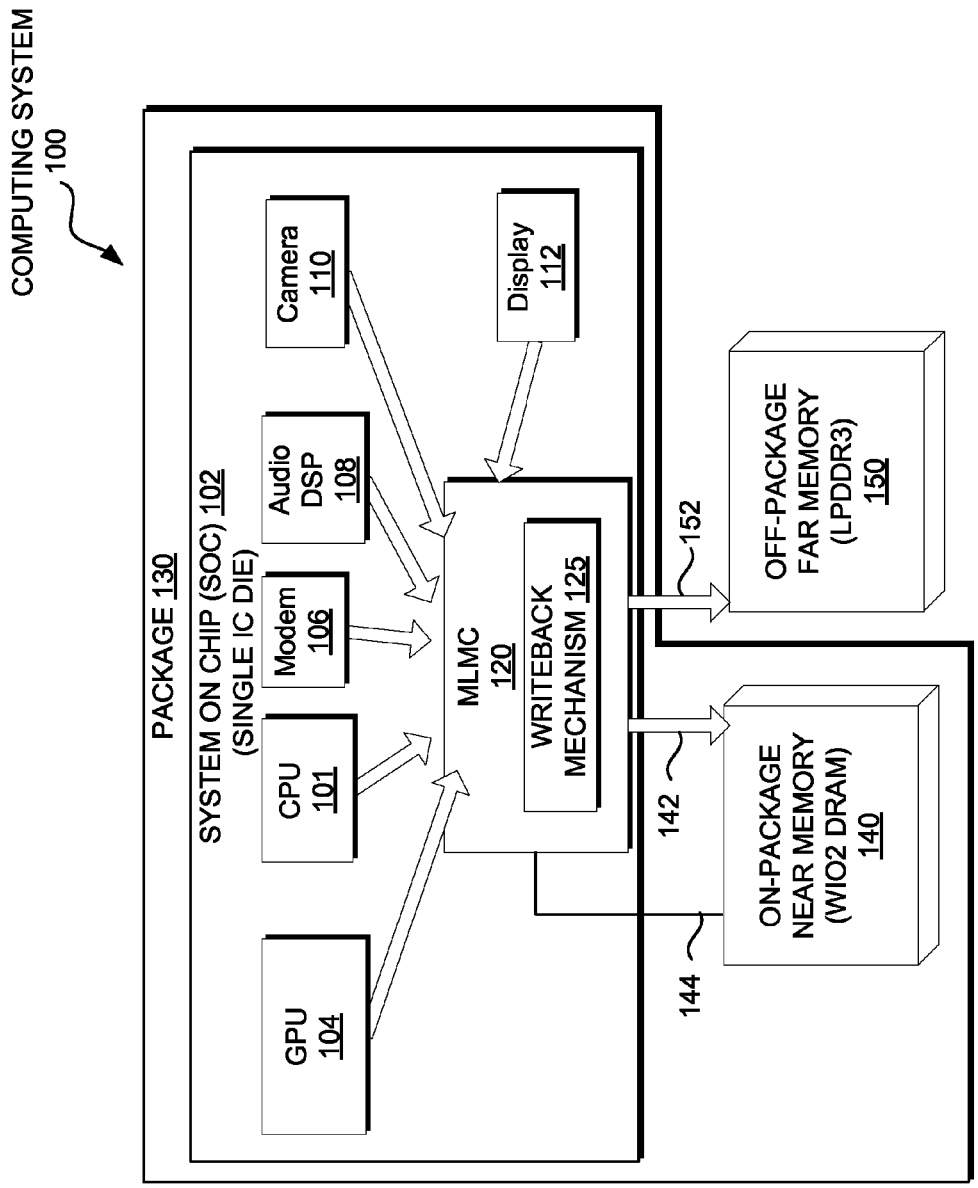
FIG. 1 is a block diagram illustrating a computing system that implements a multi-level memory controller (MLMC) with a writeback mechanism for a multi-level memory (MLM) architecture according to one embodiment.

Embodiments of the disclosure provide multi-level memory architectures managed by one or more multi-level memory controllers. In one embodiment, a processor includes a requesting unit, a first memory interface to couple to a far memory (FM), a second memory interface to couple to a near memory (NM) and a multi-level memory controller (MLMC) coupled to the requesting unit, the first memory interface and the second memory interface.

The MLMC is to write data into a memory page of NM in response to a request from the requesting unit to retrieve the memory page from FM. The MLMC receives a hint from the requesting unit and clears a writeback bit for the memory page indicated in the hint. The hint indicates that the data contained in the memory page of the NM is not to be subsequently requested by the requesting unit. The MLMC starts a writeback operation of a memory sector including the memory page and one or more additional memory pages. The writeback operation is to transfer the data contained in the memory page from the NM to the FM when the writeback bit is set and the writeback operation is not to transfer the data contained in the memory page from NM to the FM when the writeback bit is cleared. In another embodiment, a System on Chip (SoC) includes multiple functional hardware units and the MLMC coupled to the multiple functional hardware units. The multi-level memory architecture may include a first-level DRAM (also referred to herein as near memory) that is located on-package of the SoC or off-package of the SoC and a second-level DRAM (also referred to herein as far memory) that is located off-package of the SoC.

Current DRAM memory technologies deliver a wide range of attributes with distinct power, performance and price tradeoffs. Some DRAM types can be optimized for lower active power but are expensive to manufacture and include in the SoC package, while other DRAM technologies can have higher active power but are cheaper to manufacture and include in the system. The embodiments described herein are directed to a multi-level memory (MLM) architecture where two or more similar or different memory types are used hierarchically. The term 2LM refers to two-level memory architecture, the term 2LM-DDR refers to a two-level memory architecture using double data rate (DDR) memory technologies, and the term MLM refers to two or more level memory architecture. In one embodiment, the multi-level memory architecture contains a smaller, faster, more expensive, lower power memory (e.g., wide input-output (I/O) two (WIO2)) coupled with a larger, slower, higher power less expensive memory (e.g., low-power double data rate three (LPDDR3)) to improve memory power-performance of a system, while keeping the cost close to a system with LPDDR3-only memory.

The embodiments described herein can be used to optimize far memory bandwidth utilization by reducing the amount of data that is transferred from near memory to far memory on writeback operations. The embodiments described herein may reduce the power consumption of an overall system, since less transactions results in less use of digital and I/O circuitry. In some cases, the use of the embodiments described herein can be used to optimize a 2LM system's performance in systems where 2LM is used with a camera unit, a display system unit, a modem baseband, or the like. For example, these types of requesting units can use the memory as memory buffers with characteristics such as those aforementioned and perform multiple requests (e.g., millions of requests) to capture or display an image frame.

FIG. 1 is a block diagram illustrating a computing system 100 that implements a multi-level memory controller (MLMC) 120 with a writeback mechanism 125 for a multi-level memory (MLM) architecture according to one embodiment. The computing system 100 includes a System on Chip (SoC) 102. The SoC 102 may include multiple functional hardware units, including, for example, one or more central processing units (CPUs) 101, one or more graphics processing units (GPUs) 104, a modem 106, an audio digital signal processor (DSP) 108, a camera processing unit 110, and a display system unit 112, each of which are coupled to the MLMC 120. These functional hardware units may be processor cores, graphics cores (also referred to as graphics units), cache elements, computation elements, voltage regulator (VR) phases, input/output (I/O) interfaces, and their controllers, network controllers, fabric controllers, or any combination thereof. These functional units may also be logical processors, which may be considered the processor cores themselves or threads executing on the processor cores. A thread of execution is the smallest sequence of programmed instructions that can be managed independently. Multiple threads can exist within the same process and share resources such as memory, while different processes usually do not share these resources.

The components of FIG. 1 can reside on "a common carrier substrate," such as, for example, an integrated circuit ("IC") die substrate, a multi-chip module substrate or the like. Alternatively, the computing system 100 may reside on one or more printed circuit boards, such as, for example, a mother board, a daughter board or other type of circuit card. In other implementations, the main memory and the computing system 100 can reside on the same or different carrier substrates.

The SoC 102 may be integrated on a single integrated circuit (IC) die within a package 130 that also includes on-package near memory 140. The MLMC 120 is coupled to the on-package near memory 140. The on-package near memory 140 may be one or more memory devices that are integrated in the package 130. In another embodiment, the near memory 140 may be off-package near memory. Alternatively, the on-package near memory 140 may be one or more memory devices that are integrated on the same single IC die as the SoC 102. The MLMC 120 is a digital circuit which manages the flow of data going to and from the on-package near memory 140. The MLMC 120 also manages the flow of data going to and from off-package memory 150. The off-package memory 150 is not part of the package 130 and can be one or more memory devices that may be part of a dual in-line memory module (DIMM) as a series of memory ICs (e.g., DRAMs). These modules may be mounted on a printed circuit board that can be plugged into a socket of a motherboard upon which the package 130 is mounted. Alternatively, the off-package memory can be mounted on the same circuit boards upon which the package 130 is mounted. Alternatively, other configurations of the on-package near memory 140 and the off-package far memory 150 are possible. For example, the near memory may be part of a dual in-line memory module (DIMM) as a series of memory ICs (e.g., DRAMs) and the far memory may be other types of memory devices.

Near memory 140 is the first level in the multi-level memory architecture. The near memory 140 typically is lower latency, higher peak bandwidth and lower power per bandwidth than far memory 150. In the following disclosure, WIO2 DRAM is used in various embodiments of the near memory 140, but other memory technologies with similar characteristics would also work. Thus, "WIO2" and "Near Memory" may be used interchangeably herein. Far memory 150 is the second level in the multi-level memory architecture. The far memory 150 typically is higher latency, lower peak bandwidth and higher power per bandwidth than the near memory 140. In the following disclosure, LPDDR3 DRAM is used in various embodiments of the far memory 150, but other memory technologies with similar characteristics would also work. Thus, "LPDDR3" and "Far Memory" may be used interchangeably herein. In one embodiment, the near memory 140 is a first memory type and the far memory 150 is a second memory type that is different than the first type. The first memory type may be lower power per bandwidth than the second memory type. The first memory type may be lower latency than the second memory type. The first memory type may be higher peak bandwidth than the second memory type. In one embodiment, the near memory 140, also referred to as the first-level memory, is embedded DRAM (eDRAM). In another embodiment, the near memory 140 is WIO2 DRAM as described herein. Alternatively, High Bandwidth Memory (HBM) can be used as near memory. Alternatively, other memory technologies can be used for the near memory 140. In another embodiment, the far memory 150, also referred to as the second-level memory, is at least one of low-power double data rate 3 (LPDDR3) DRAM, LPDDR4 DRAM, DDR3 DRAM, DDR3L DRAM, or DDR4 DRAM. Alternatively, other memory technologies can be used for the far memory 150. In other embodiments, the near memory 140 and the far memory 150 may be the same types of memories.

There may be other configurations of the computing system 100, such as a Package on Package (PoP) configuration. PoP is an integrated circuit packaging method that combines vertically discrete logic and memory ball grid array (BGA) packages. Two or more packages are installed atop each other, i.e., stacked, with an interface to route signals between them. PoP configurations allow higher component density in devices, such as mobile phones, personal digital assistants (PDA), tablets, digital cameras and the like. For example, the SoC 102 can be in a first package on the bottom (side closest to motherboard) and a memory package with the near memory 140 on the top. Other configurations are stacked-die packages where multiple integrated circuit dies are stacked instead of packages as described above.

The memory subsystem of the SoC 102 includes the MLMC 120 to manage the multi-level memory architecture including near memory 140 and far memory 150. During operation, the MLMC 120 receives memory requests from functional units (e.g., CPU 101, GPU 104, modem 105, audio DSP 108, camera 110 or other devices. The MLMC 120 maps the memory request to the near memory 140 or the far memory 150 according to a memory management scheme.

In one embodiment, the MLMC 120, including the writeback mechanism 125, is coupled to the near memory (NM) 140 via a first memory interface 142 and to the far memory (FM) 150 via a second memory interface 152. The MLMC 120 is to write data into a memory page of NM 140 in response to a request from the requesting unit to retrieve the memory page from FM 150. The MLMC 120 receives a hint from the requesting unit. The hint indicates that the data contained in the memory page of the NM 140 is not subsequently requested by the requesting unit. The MLMC 120 clears a writeback bit for the memory page indicated in the hint. The MLMC 120 starts a writeback operation of a memory sector including the memory page and one or more additional memory pages. The writeback operation is to transfer the data contained in the memory page from the NM 140 to the FM 150 when the writeback bit is set and the writeback operation does not transfer the data contained in the memory page from NM 140 to the FM 150 when the writeback bit is cleared.

In a further embodiment, the writeback operation is started in response to at least one of a write request or a read request from the requesting unit that miss the cache and causing an eviction. For example, the writeback operation may be started in response to a write request to a memory position in NM 140 that contains the memory page. In another embodiment, the MLMC 120 is to start the writeback operation in response to a scrubbing operation of the memory page in NM 140. In another embodiment, the MLMC 120 is to start the writeback operation in response to a management action triggered by the MLMC 120.

In some embodiments, the requesting unit uses a memory region, including the memory page, as a data buffer in which data is read, consumed and is not to be subsequently requested (i.e., not needed again by the requesting unit).

In a further embodiment, the hint is received as part of the request. In another embodiment, the MLMC is to receive the hint as part of an asynchronous message from the requesting unit to the MLMC. The hint may be included in a field in the asynchronous message. The asynchronous message can be received over the first memory interface. In one embodiment, the first interface 142 includes a datapath and a primary communication network. The asynchronous message can be received over the datapath. In another embodiment, the asynchronous message can be received over the primary communication network, such as part of a read request. The asynchronous message can be received over a sideband channel 144. The sideband channel 144 can be a dedicated communication channel between the MLMC 120 and the near memory 140. In another embodiment, the hint can be received as part of an opcode.

The computing system 100 may include one or more functional units that execute instructions that cause the computing system to perform any one or more of the methodologies discussed herein. The computing system 100 may be connected (e.g., networked) to other machines in a LAN, an intranet, an extranet, or the Internet. The computing system 100 may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated for the computing system 100, the term "machine" shall also be taken to include any collection of machines that individually or jointly execute a set (or multiple sets) of instructions to perform any one or more of the methodologies discussed herein.

In addition to the illustrated components, the computing system 100 may include one or more processors, one or more main memory devices, one or more static memory devices and one or more data storage device, which communicate with each other via a bus. The processors may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processor may also be one or more special-purpose processing devices such as an application specific integrated circuit (ASIC), a field programmable gate array (FPGA), a digital signal processor (DSP), network processor, or the like. In one embodiment, processor may include one or processing cores. The processor is configured to execute the processing logic for performing the operations discussed herein. In one embodiment, processor is the same as SoC 102 of FIG. 1 that implements one or more MLMCs 120. Alternatively, the computing system 100 can include other components as described herein, as well as network interface device, video display units, alphanumeric input devices, cursor control devices, a signal generation device, or other peripheral devices.

In another embodiment, the computing system 100 may include a chipset (not illustrated), which refers to a group of integrated circuits, or chips, that are designed to work with the SoC 102 and controls communications between the SoC 102 and external devices. For example, the chipset may be a set of chips on a motherboard that links the CPU 101 to very high-speed devices, such as far memory 150 and graphic controllers, as well as linking the CPU 101 to lower-speed peripheral buses of peripherals, such as USB, PCI or ISA buses.

The data storage device (not illustrated) may include a computer-readable storage medium on which is stored software embodying any one or more of the methodologies of functions described herein. The software may also reside, completely or at least partially, within the main memory as instructions and/or within the SoC 102 as processing logic during execution thereof by the computing system 100. The computer-readable storage medium may also be used to store instructions for the operations of the MLMC 120, and/or a software library containing methods that call the above applications. Alternatively, the MLMC 120 may include firmware that executes the instructions.

Figure 2:
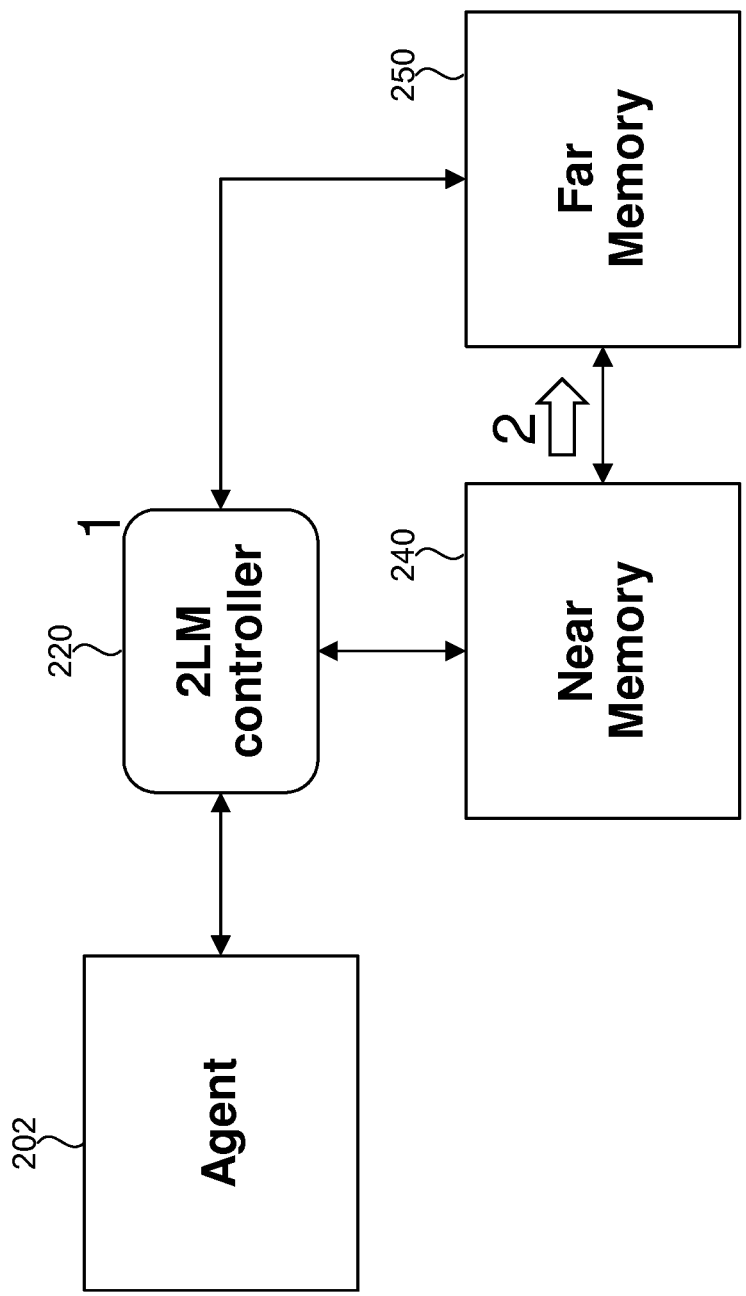
FIG. 2 is a block diagram illustrating a MLMC without a writeback mechanism according to one implementation.
Figure 3:
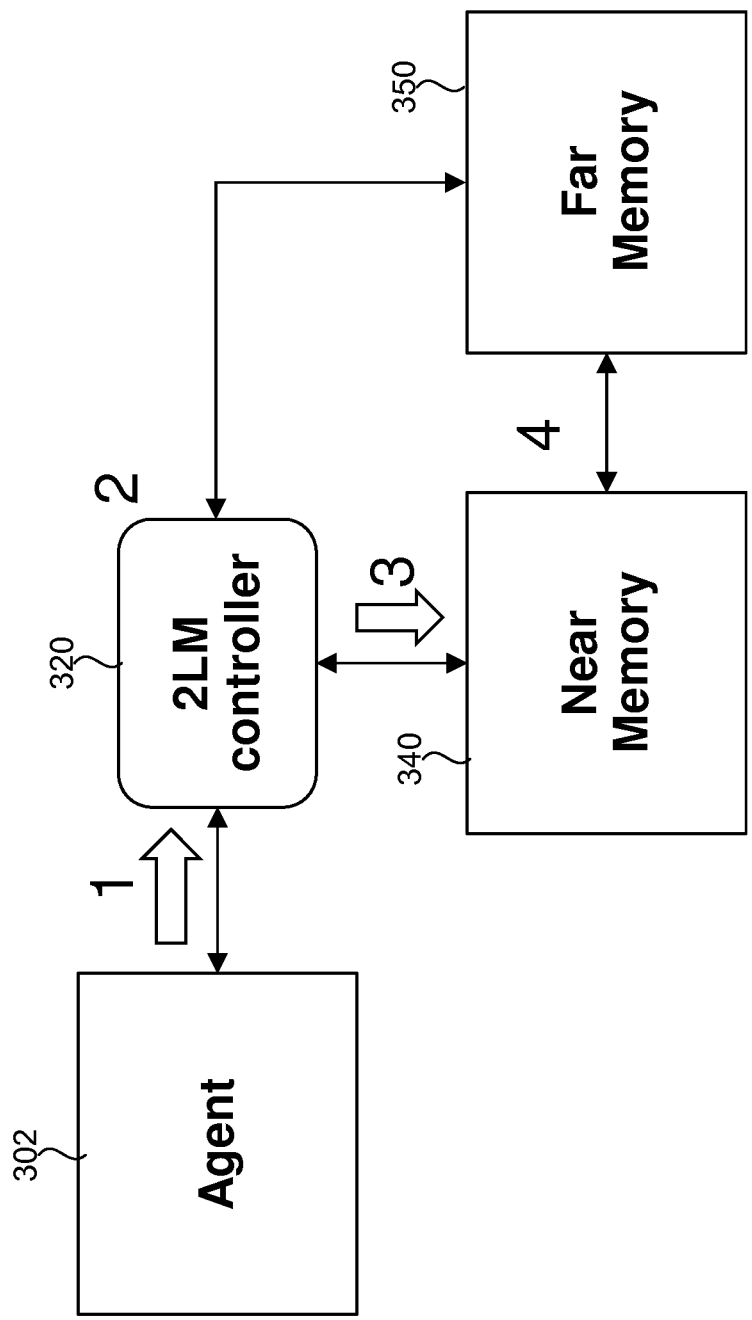
FIG. 3 is a block diagram illustrating a MLMC with a writeback mechanism according to one embodiment.

In a typical 2LM system, a write or a read request for a memory position, the scrubbing of a memory page, or other management actions triggered by the 2LM controller can cause a writeback operation. This writeback is typically a transfer of the data contained in a page of memory (memory page) from Near Memory (NM) to Far Memory (FM), as illustrated in FIG. 2. However, some agents might use memory pages of a memory region as a data buffer. In some cases, once the data is stored and read, it is consumed and is not to be subsequently requested. If a writeback operation is done in those memory pages, an unnecessary and costly transfer of data from FM to NM occurs. The embodiments described herein can be used to prevent or reduce these unnecessary data transfers, such as illustrated in FIG. 3. The embodiments described herein can be used to optimize the Far Memory bandwidth utilization and the system's power consumption as described herein.

FIG. 2 is a block diagram illustrating a MLMC 220 without a writeback mechanism according to one implementation. In this implementation, the MLMC 220 is a 2LM controller. The 2LM controller 220 is coupled to a requesting agent 202 (also referred to herein as requesting unit), a near memory (NM) 240 and a far memory (FM) 250. The 2LM controller 220 starts a writeback operation of a memory page from NM 240 to FM 250. This could be caused by a scrubber operation or by a write request for that memory position. The 2LM controller 220 writes that memory page's data from NM 240 to FM 250, freeing the memory space in NM 240 to accommodate future requests. Some requesting units can use memory as a data buffer, in which case the data is stored, consumed and not used again. The FM write bandwidth is constrained as a result of these unnecessary data transfers from NM 240 to FM 250.

The embodiments described herein can reduce the FM write bandwidth constraints by reducing the unnecessary data transfers as illustrated in FIG. 3. The embodiments described herein can reduce the FM bandwidth utilization in writeback cases using a hint as illustrated in FIG. 3. The hint can be an indication, sent by a requesting agent to the 2LM controller, for example, along with the reading request. The hint lets the 2LM controller know that the read data is not needed anymore. Therefore, the 2LM controller can clear the page's dirty bit (also referred to herein as a writeback bit). In the case that a writeback operation occurs, no data from the memory page is transferred from NM to FM. In one embodiment, the hint indicates that the data is already consumed and not needed again, so if a writeback operation occurs on the memory pages of the buffer, no data is transferred from NM to FM.

FIG. 3 is a block diagram illustrating a MLMC 320 with a writeback mechanism according to one embodiment. In this embodiment, the MLMC 320 is a 2LM controller. In other embodiments, other MLMCs can be used. The 2LM controller 320 is coupled to a requesting agent 302 (also referred to herein as requesting unit), a near memory (NM) 340 and a far memory (FM) 350. Once the requesting agent 302 determines that it has consumed the data in a memory page, it sends a "hint" to the 2LM controller 320 and the 2LM controller 320 clears the memory page's writeback bit (e.g., dirty bit). The 2LM controller 320 eventually starts a writeback operation of these memory positions (e.g., the memory page). This could be caused by a scrubber operation or by a write request for that memory position. Since data is not marked "dirty" because the memory page's writeback bit is cleared, no data is written back to FM. That is there is no transfer of the data from NM 340 to FM 350 as done in the implementation of FIG. 2. This can improve the system's power consumption and BW utilization.

It should be noted that the requesting agents can have knowledge on how the data is being consumed. Thus, the requesting agents can provide the hints to the 2LM controller 320. The 2LM controller 320 provides control of the flow of information based on the hint so that if a writeback operation happens on the memory page, not data is transferred from the NM 340 to the FM 350.

As it was aforementioned, some agents use memory as a data buffer, where data is stored, consumed (read) and never needed again. Far Memory bandwidth is constrained, so embodiments that provide optimizations to reduce the number of unnecessary data transfers on data that does not need to be written back can have a large impact on the system's performance and power consumption.

Figure 4:
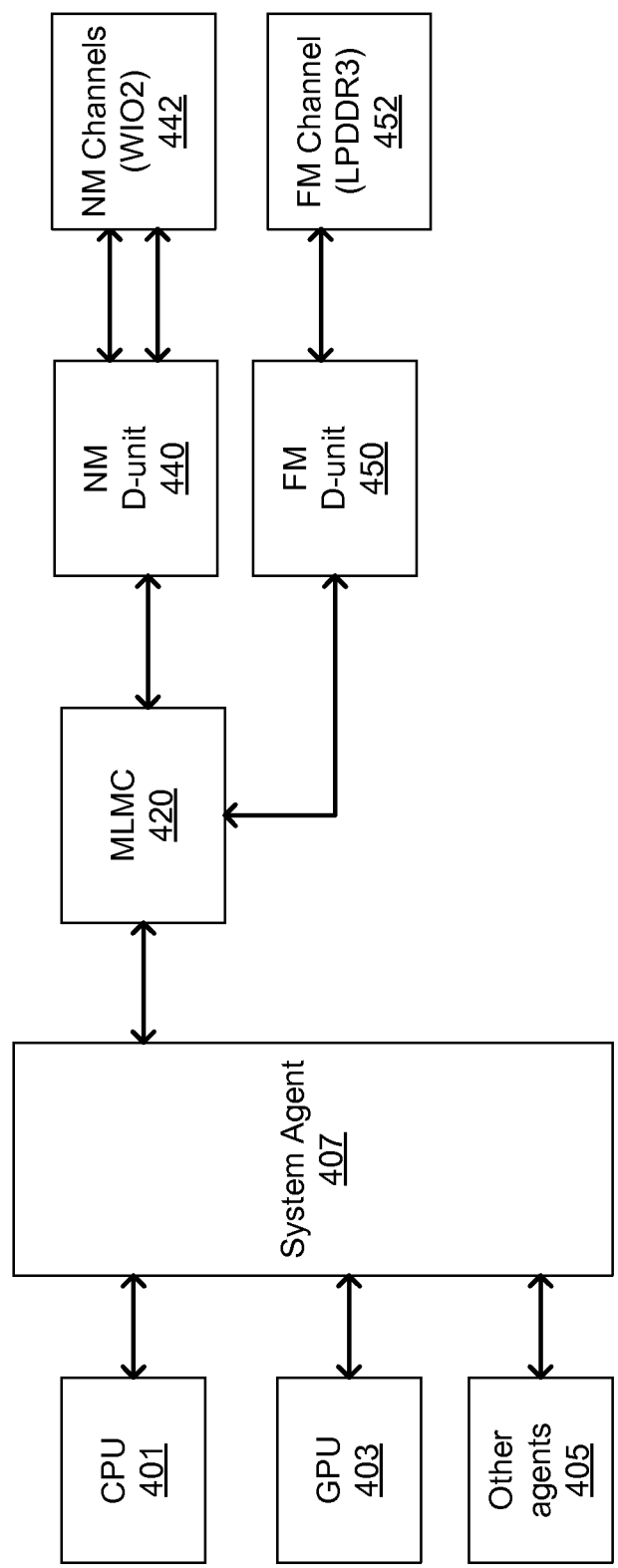
FIG. 4 is a block diagram illustrating a system interconnect for a MLM architecture according to one embodiment.

FIG. 4 is a block diagram illustrating a system interconnect 400 for a MLM architecture according to one embodiment. The system interconnect 400 includes a MLMC 420. However, additional MLMCs can be added to add additional memory channels. The MLMC 420 can interface with a system agent 407 that interfaces with a CPU 401, a GPU 403 and other agents 405. The CPU 401, GPU 403 and other agents 405 can issue memory requests in the MLM architecture. As described above, the MLMC 420 can implement the writeback mechanisms as described herein to reduce unnecessary data transfers during writeback operations when the data is no longer needed.

In the depicted embodiment, the system interconnect fabric includes WIO2 as the near memory and LPDDR3 as the far memory. The FM D-unit 450 is the memory controller for the FM channel 452 (LPDDR3 channel) while the NM D-unit 440 is the memory controller for two near memory channels each (WIO2 ch0 and ch1). The FM D-unit 450 is coupled to the FM channel 452, which is to be coupled to a FM device. In other embodiments, additional far memory devices can be added to scale the amount of far memory for the main memory. The NM D-unit 440 interfaces to one or more near memory devices via the NM channel 442. In other embodiments, additional near memory devices can be added to scale the amount of near memory for cache. In other embodiments, additional units can be used to coordinate multiple D-units, or multiple MLMCs, such as an arbiter, a crossbar switch, or the like. The microarchitecture shown in FIG. 4 has two near memory WIO2 channels and one far memory LPDDR3 channels. However, the micro-architecture of FIG. 4 is scalable to support more channels if higher bandwidth and capacity is needed in the system.

In one embodiment, a memory request is received at the system agent 407 from one of the CPU 401, GPU 403 or other agents 405, and the system agent 407 directs the memory request to the MLMC 420. The MLMC 420 can perform a lookup to map the memory request to either near or far memory. If the lookup results in the memory request being mapped to near memory (which may be considered a MLMC cache hit), the MLMC 420 directs the memory request to the WIO2 D-unit 440, which can further decode the memory request to determine a WIO2 channel as described herein. If the lookup results in the memory request being mapped to far memory (which may be considered a MLMC cache miss), the MLMC 420 directs the memory request to the LPDDR3 D-unit 450, which interfaces with the LPDDR3 channel 452.

When a writeback operation is started, the MLMC 420 can determine whether a writeback bit is cleared or set for the memory page to be written back. If the writeback bit is set, the data is transferred from NM to FM via the corresponding NM channel 442, NM D-unit 440, MLMC 420, FM D-unit 450 and FM channel 452. If the writeback bit is cleared, the data is not transferred from the NM to FM, avoiding an unnecessary data transfer during the writeback operation when the data is no longer needed, as indicated in the hint received by the MLMC 420.

Figure 5:
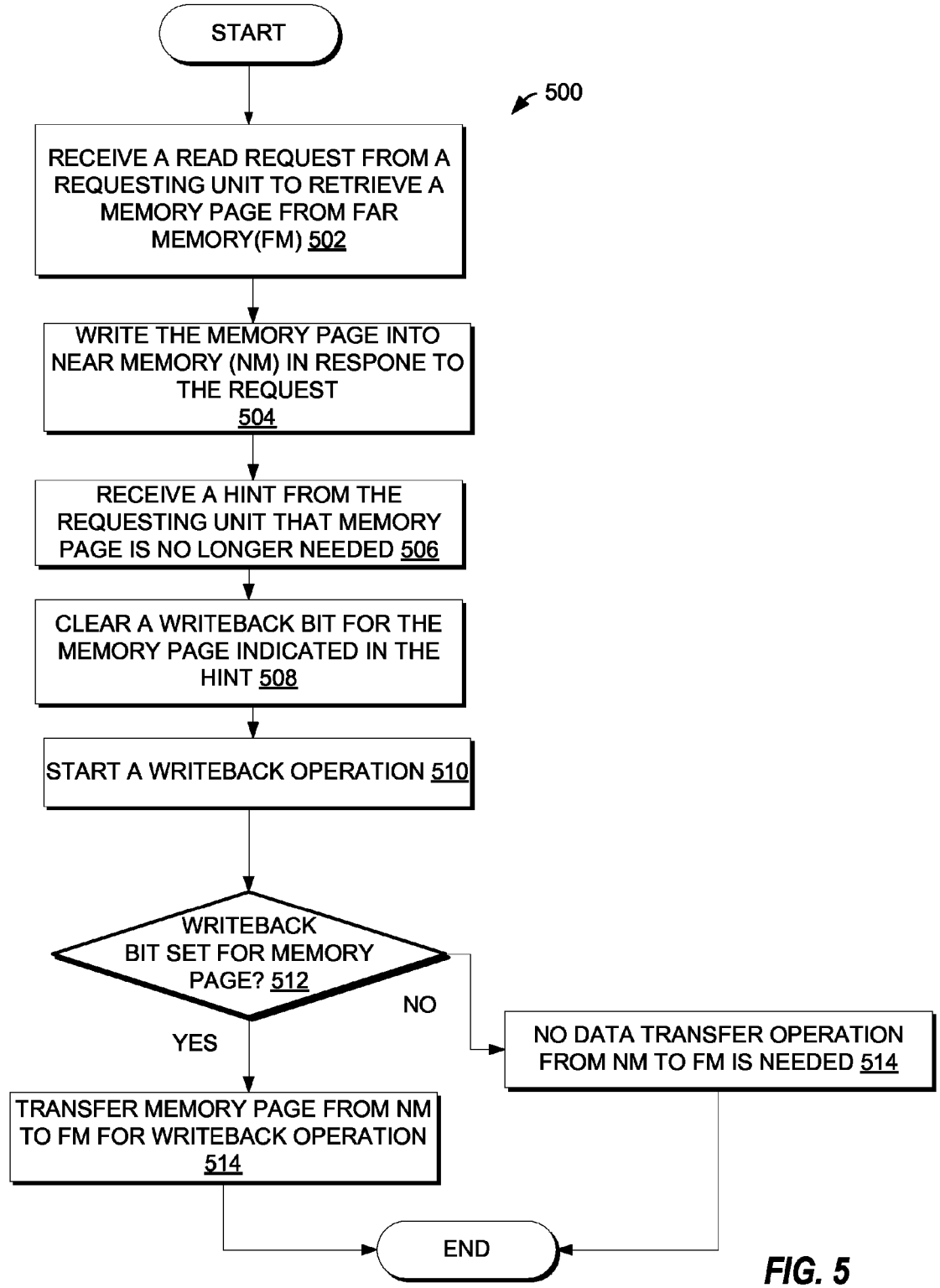
FIG. 5 is a flow diagram illustrating a method of reducing writeback operations from near memory to far memory according to one embodiment.
Figure 6:
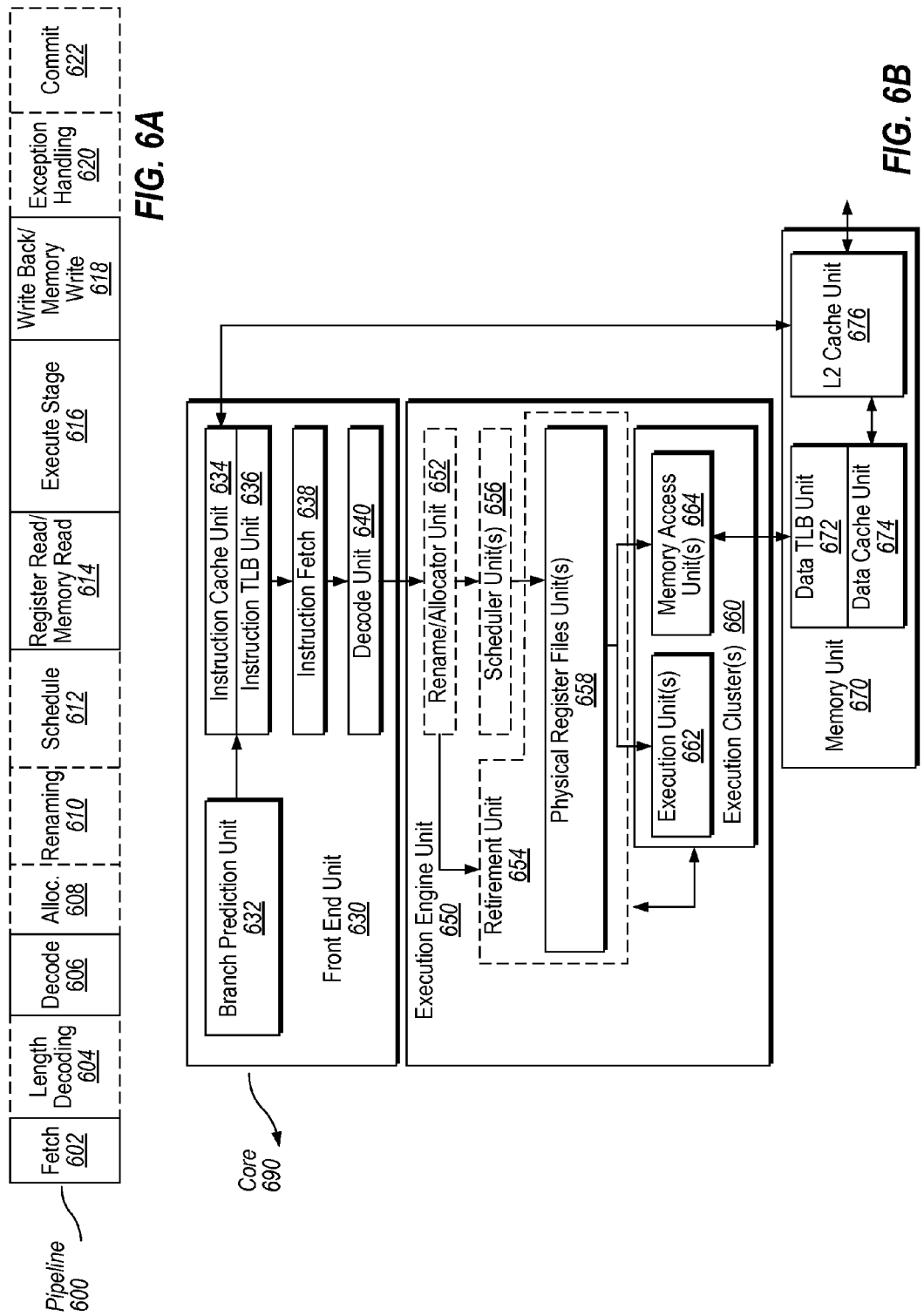
FIG. 6A is a block diagram illustrating an in-order pipeline and a register renaming stage, out-of-order issue/execution pipeline according to one embodiment.
FIG. 6B is a block diagram illustrating a micro-architecture for a processor that implements dynamic heterogeneous hashing according to one embodiment.

FIG. 5 is a flow diagram illustrating a method 500 of reducing writeback operations from near memory to far memory according to one embodiment. Method 500 may be performed by processing logic that may comprise hardware (e.g., circuitry, dedicated logic, programmable logic, microcode, etc.), software (such as instructions running on the MLMC), firmware or a combination thereof. In one embodiment, method 500 is performed by MLMC 120 of FIG. 1. In another embodiment, the method 500 is performed by the writeback mechanism 125 of FIG. 1. In another embodiment, the method 500 is performed by 2LM controller 320 of FIG. 3. In another embodiment, the method 500 is performed by MLMC 420 of FIG. 4. MLMC0 620 or MLMC1 625 of FIG. 6. Alternatively, other components of the computing system 100 or system interconnect 400 may perform some or all of the operations of the method 500.

Referring to FIG. 5, the method 500 begins by the processing logic receiving a request from a requesting unit to retrieve a memory page from far memory (FM) (block 502). The processing logic writes the memory page into near memory (NM) in response to the request (block 504). The processing logic receives a hint from the requesting unit (block 506). The hint indicates that the data contained in the memory page of the NM is not to be subsequently requested by the requesting unit. The processing logic clears a writeback bit for the memory page indicated in the hint (block 508). The processing logic starts a writeback operation of a memory sector comprising the memory page and one or more additional memory pages (block 510). At block 512, the processing logic checks to see if the writeback bit is set for the memory page during the writeback operation. The writeback operation is to transfer the data contained in the memory page from the NM to the FM when the writeback bit is set (block 514). The writeback operation does not transfer the data contained in the memory page from NM to the FM when the writeback bit is cleared (block 514), and the method 500 ends.

In a further embodiment, the starting the writeback operation at block 510 is done in response to at least one of a write request to a memory position of NM containing the memory page, a scrubbing operation of the memory page in NM, or a management action triggered by the MLMC.

In another embodiment, the hint is received at block 506 as part of the request. In another embodiment, the hint is received at block 506 as part of an asynchronous message from the requesting unit to the MLMC. In another embodiment, the hint is received at block 506 as part of an opcode.

In one embodiment, the multi-level memory architecture includes a first-level DRAM that is located on-package (or off-package) and a second-level DRAM that is located off-package. The processing logic receives a memory request from one of functional units. The processing logic maps the memory request to the first-level DRAM or the second-level DRAM according to a memory management scheme.

FIG. 6A is a block diagram illustrating a micro-architecture for a processor 600 that implements dynamic heterogeneous hashing according to one embodiment. Specifically, processor 600 depicts an in-order architecture core and a register renaming logic, out-of-order issue/execution logic to be included in a processor according to at least one embodiment of the disclosure.

Processor 600 includes a front end unit 630 coupled to an execution engine unit 650, and both are coupled to a memory unit 670. The processor 600 may include a reduced instruction set computing (RISC) core, a complex instruction set computing (CISC) core, a very long instruction word (VLIW) core, or another alternative core type. As yet another option, processor 600 may include a special-purpose core, such as, for example, a network or communication core, compression engine, graphics core, or the like. In one embodiment, processor 600 may be a multi-core processor or may be part of a multiprocessor system.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 660. The decode unit 660 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 660 may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to the memory unit 670. The decode unit 660 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations (RS), central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which may include a data prefetcher 680, a data TLB unit 672, a data cache unit (DCU) 674, and a level 2 (L2) cache unit 676, to name a few examples. In some embodiments DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary embodiment, the memory access units 664 may include a load unit, a store address unit, and a store data unit, each of which is coupled to the data TLB unit 672 in the memory unit 670. The L2 cache unit 676 may be coupled to one or more other levels of cache and eventually to a main memory.

In one embodiment, the data prefetcher 680 speculatively loads/prefetches data to the DCU 674 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 600 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 6B is a block diagram illustrating an in-order pipeline and a register renaming stage, out-of-order issue/execution pipeline implemented by processing device 600 of FIG. 6A according to some embodiments of the disclosure. The solid lined boxes in FIG. 6B illustrate an in-order pipeline, while the dashed lined boxes illustrates a register renaming, out-of-order issue/execution pipeline. In FIG. 6B, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624. In some embodiments, the ordering of stages 602-624 may be different than illustrated and are not limited to the specific ordering shown in FIG. 6B.

Figure 7:
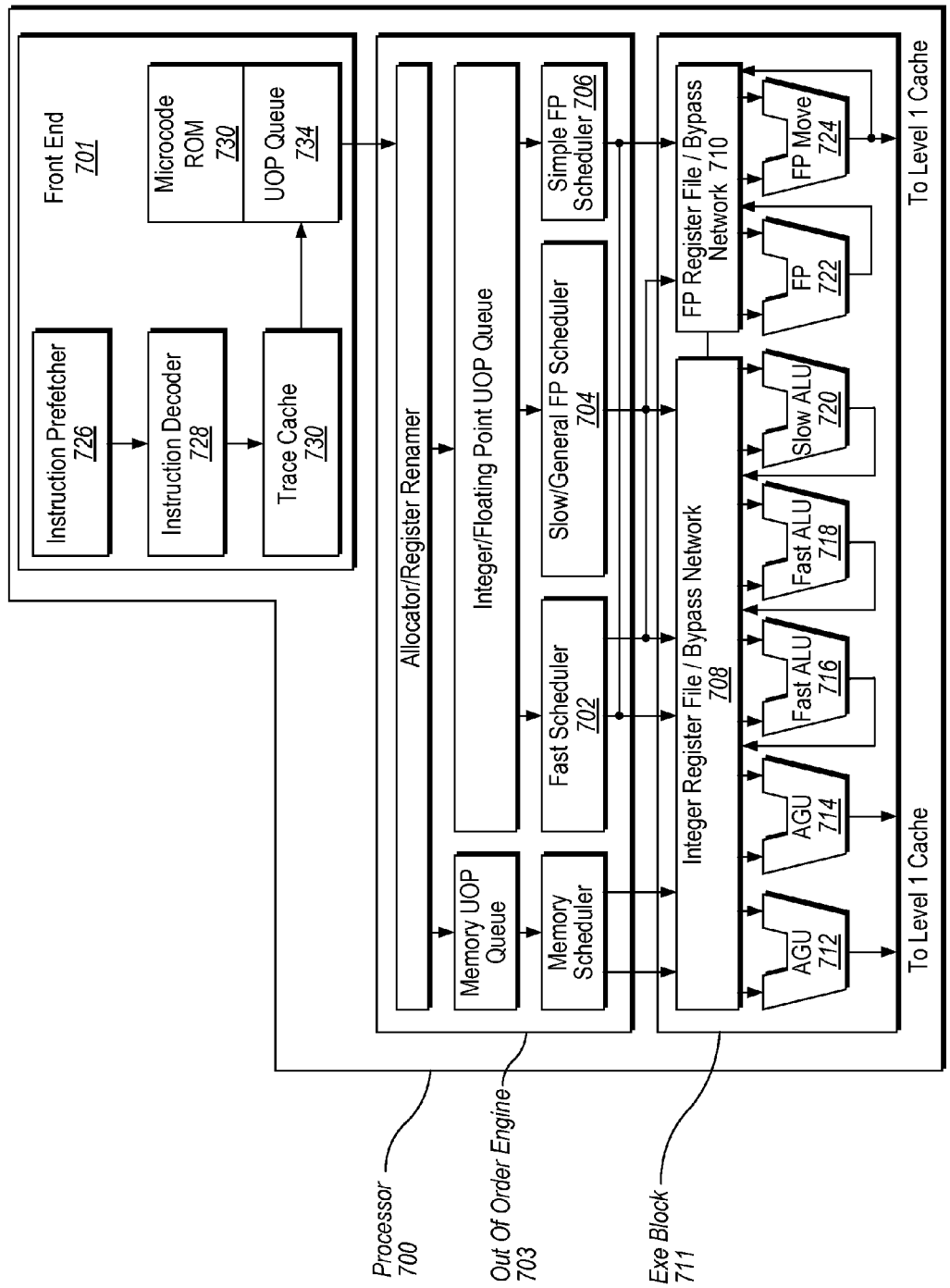
FIG. 7 illustrates a block diagram of the micro-architecture for a processor that includes logic circuits to perform dynamic heterogeneous hashing according to one embodiment.

FIG. 7 illustrates a block diagram of the micro-architecture for a processor 700 that includes logic circuits to perform dynamic heterogeneous hashing according to one embodiment. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 701 is the part of the processor 700 that fetches instructions to be executed and prepares them to be used later in the processor pipeline.

The front end 701 may include several units. In one embodiment, the instruction prefetcher 716 fetches instructions from memory and feeds them to an instruction decoder 718 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one embodiment, if more than four micro-ops are needed to complete an instruction, the decoder 718 accesses the microcode ROM 732 to do the instruction. For one embodiment, an instruction can be decoded into a small number of micro ops for processing at the instruction decoder 718. In another embodiment, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment can schedule on each half of the main clock cycle while the other schedulers can only schedule once per main processor clock cycle. The schedulers arbitrate for the dispatch ports to schedule uops for execution.

Register files 708, 710, sit between the schedulers 702, 704, 706, and the execution units 712, 714, 716, 718, 710, 712, 714 in the execution block 711. There is a separate register file 708, 710, for integer and floating point operations, respectively. Each register file 708, 710, of one embodiment also includes a bypass network that can bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128 bit wide entries because floating point instructions typically have operands from 64 to 128 bits in width.

The execution block 711 contains the execution units 712, 714, 716, 718, 710, 712, 714, where the instructions are actually executed. This section includes the register files 708, 710, that store the integer and floating point data operand values that the micro-instructions need to execute. The processor 700 of one embodiment is comprised of a number of execution units: address generation unit (AGU) 712, AGU 714, fast ALU 716, fast ALU 718, slow ALU 710, floating point ALU 712, floating point move unit 714. For one embodiment, the floating point execution blocks 712, 714, execute floating point, MMX, SIMD, and SSE, or other operations. The floating point ALU 712 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 710 as the slow ALU 710 includes integer execution hardware for long latency type of operations, such as a multiplier, shifts, flag logic, and branch processing. Memory load/store operations are executed by the AGUs 712, 714. For one embodiment, the integer ALUs 716, 718, 710, are described in the context of performing integer operations on 64 bit data operands. In alternative embodiments, the ALUs 716, 718, 710, can be implemented to support a variety of data bits including 16, 32, 128, 256, etc. Similarly, the floating point units 712, 714, can be implemented to support a range of operands having bits of various widths. For one embodiment, the floating point units 712, 714, can operate on 128 bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 700 also includes logic to implement dynamic heterogeneous hashing according to one embodiment. In one embodiment, the execution block 711 of processor 700 may include MCU 115, to perform dynamic heterogeneous hashing according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
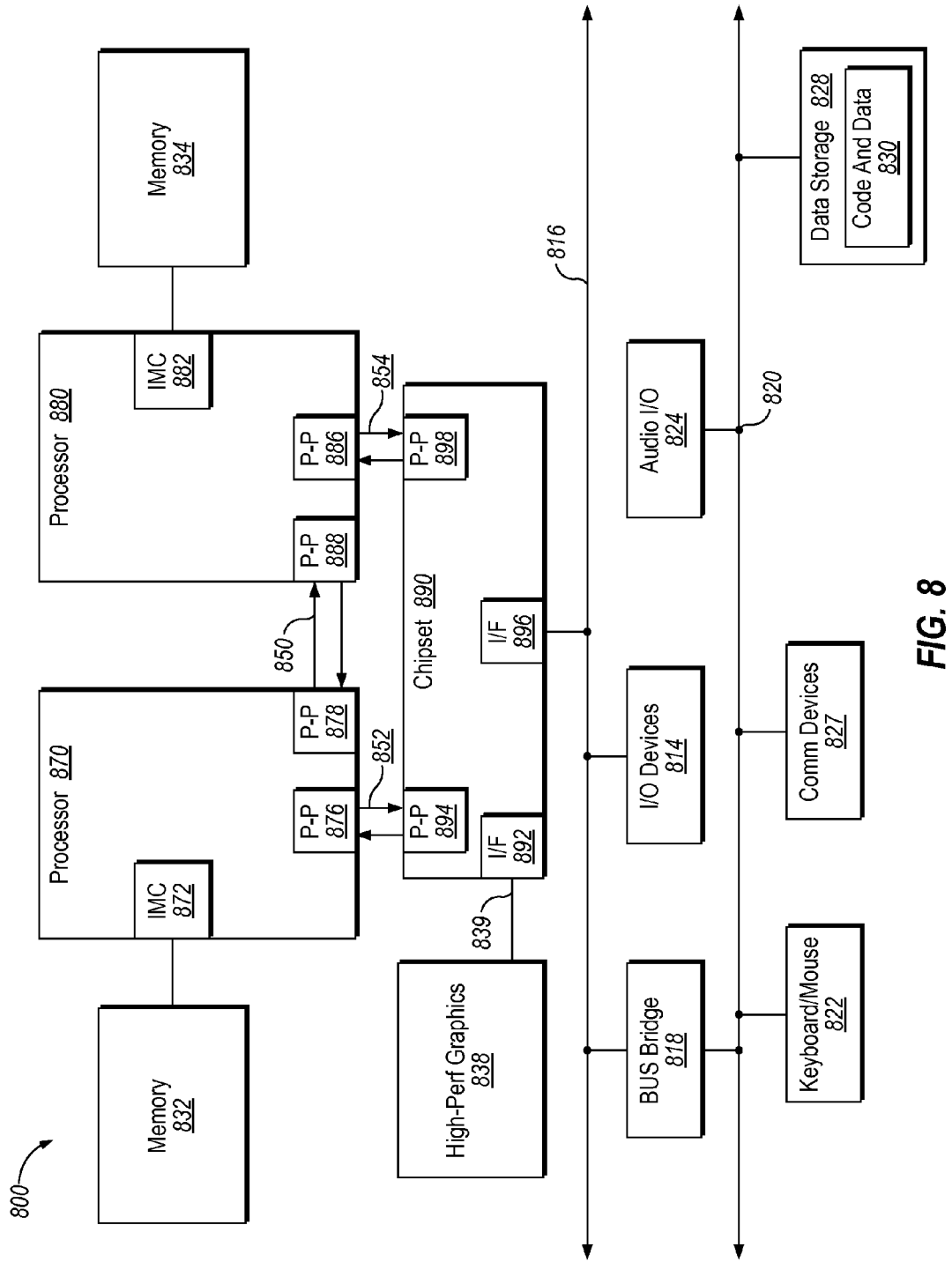
FIG. 8 is a block diagram of a computer system according to one implementation.

Embodiments may be implemented in many different system types. Referring now to FIG. 8, shown is a block diagram of a multiprocessor system 800 in accordance with an implementation. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (i.e., processor cores 874a and 874b and processor cores 884a and 884b), although potentially many more cores may be present in the processors. The processors each may include write mode logics in accordance with an embodiment of the present.

While shown with two processors 870, 880, it is to be understood that the scope of the present disclosure is not so limited. In other implementations, one or more additional processors may be present in a given processor.

Processors 870 and 880 are shown including integrated memory controller units 882 and 882, respectively. Processor 870 also includes as part of its bus controller units point-to-point (P-P) interfaces 876 and 888; similarly, second processor 880 includes P-P interfaces 886 and 888. Processors 870, 880 may exchange information via a point-to-point (P-P) interface 850 using P-P interface circuits 888, 888. As shown in FIG. 8, IMCs 882 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present disclosure is not so limited.

As shown in FIG. 8, various I/O devices 814 may be coupled to first bus 816, along with a bus bridge 818 which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to second bus 820. Note that other architectures are possible. For example, instead of the point-to-point architecture of FIG. 8, a system may implement a multi-drop bus or other such architecture.

Figure 9:
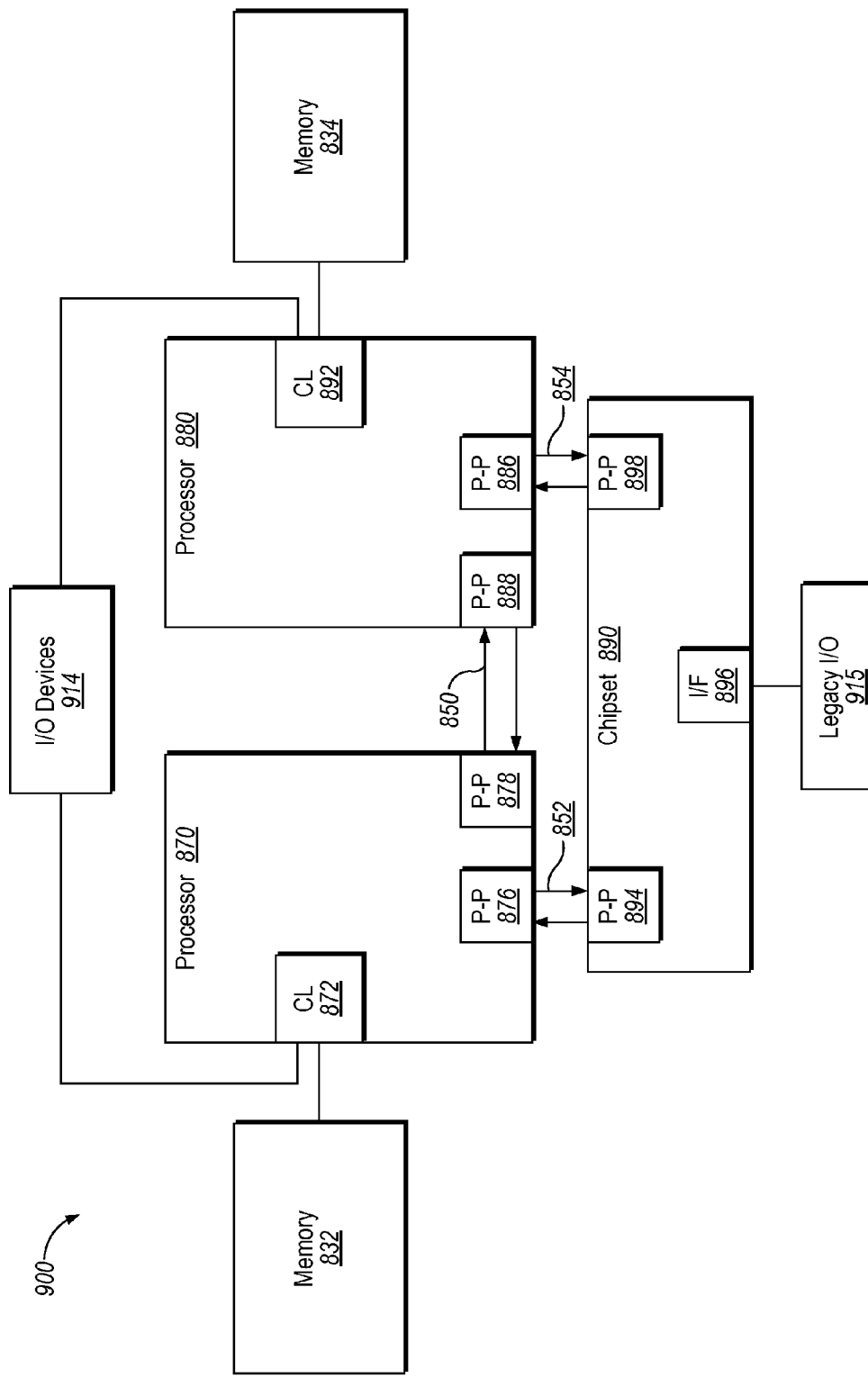
FIG. 9 is a block diagram of a computer system according to another implementation.

Referring now to FIG. 9, shown is a block diagram of a third system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 970, 980 may include integrated memory and I/O control logic ("CL") 972 and 982, respectively. For at least one embodiment, the CL 972, 982 may include integrated memory controller units such as described herein. In addition. CL 972, 982 may also include I/O control logic. FIG. 9 illustrates that the memories 932, 934 are coupled to the CL 972, 982, and that I/O devices 914 are also coupled to the control logic 972, 982. Legacy I/O devices 915 are coupled to the chipset 990.

Figure 10:
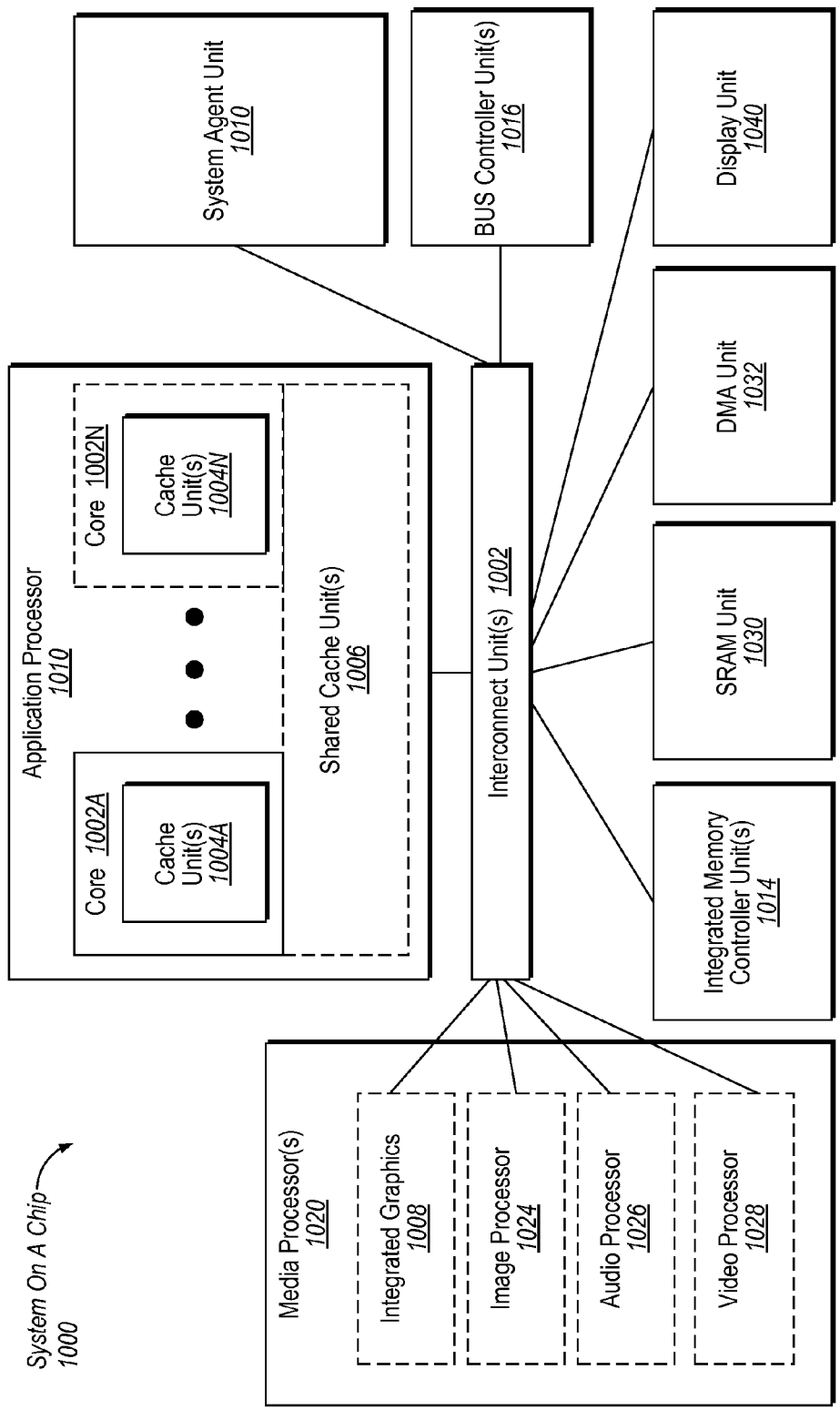
FIG. 10 is a block diagram of a system-on-a-chip according to one implementation.

FIG. 10 is an exemplary system on a chip (SoC) that may include one or more of the cores 1002. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 10, shown is a block diagram of a SoC 1000 in accordance with an embodiment of the present disclosure. Similar elements in FIG. 5 bear like reference numerals. Also, dashed lined boxes are features on more advanced SoCs. In FIG. 10, an interconnect unit(s) 1002 is coupled to: an application processor 1010 which includes a set of one or more cores 1002A-N and shared cache unit(s) 1006; a system agent unit 1010; a bus controller unit(s) 1016; an integrated memory controller unit(s) 1014; a set or one or more media processors 1020 which may include integrated graphics logic 1008, an image processor 1024 for providing still and/or video camera functionality, an audio processor 1026 for providing hardware audio acceleration, and a video processor 1028 for providing video encode/decode acceleration; a static random access memory (SRAM) unit 1030; a direct memory access (DMA) unit 1032; and a display unit 1040 for coupling to one or more external displays.

Figure 11:
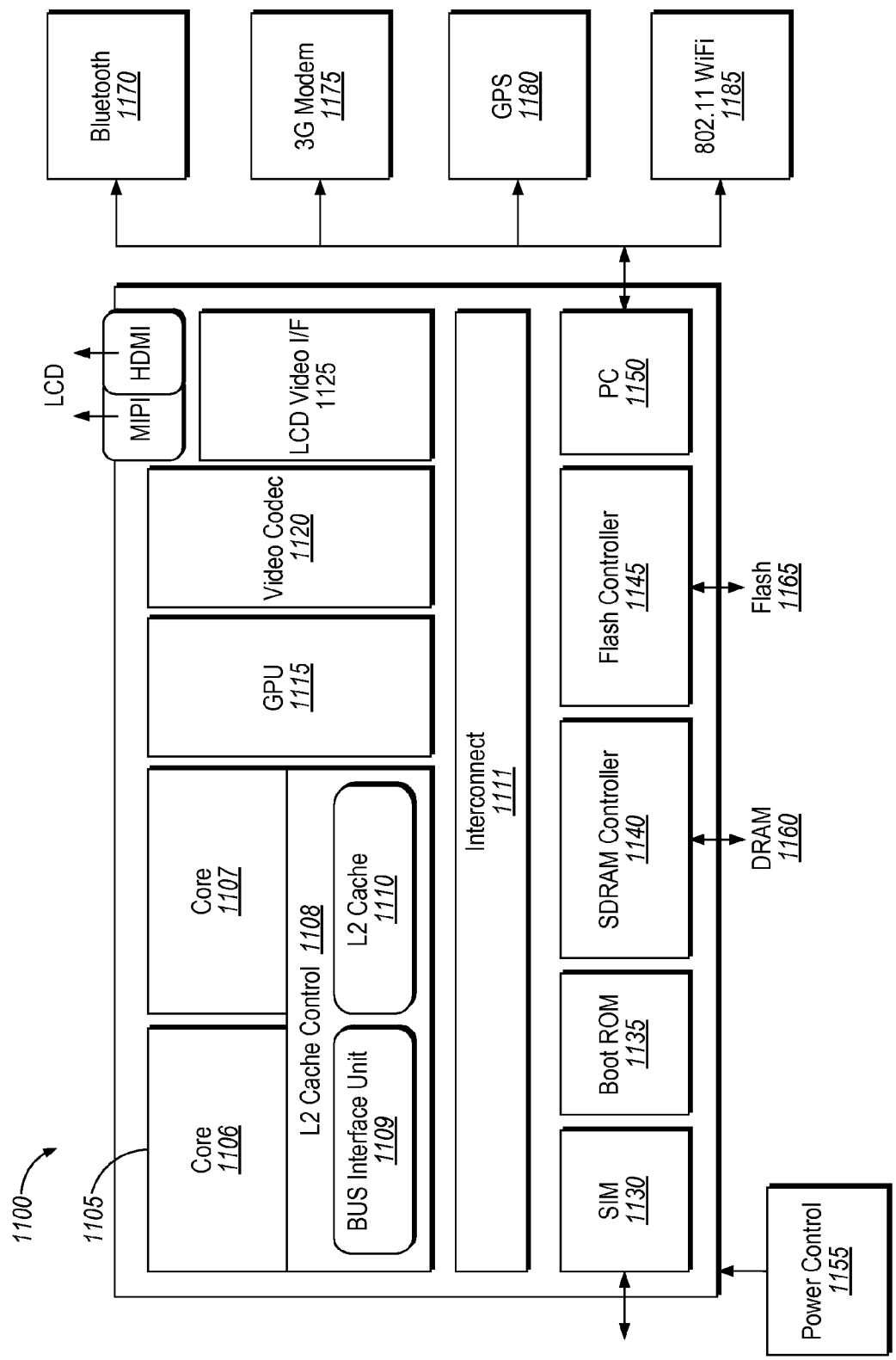
FIG. 11 illustrates another implementation of a block diagram for a computing system.

Turning next to FIG. 11, an embodiment of a system on-chip (SoC) design in accordance with embodiments of the disclosure is depicted. As an illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network.

Here, SoC 1100 includes 2 cores—1106 and 1107. Similar to the discussion above, cores 1106 and 1107 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnects discussed above, which can implement one or more aspects of the described disclosure.

Interconnect 1111 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the embodiments described herein.

In addition, the system illustrates peripherals for communication, such as a Bluetooth module 1170, 3G modem 1175, GPS 1180, and Wi-Fi 1185. Note as stated above, a UE includes a radio for communication. As a result, these peripheral communication modules may not all be included. However, in a UE some form of a radio for external communication should be included.

Figure 12:
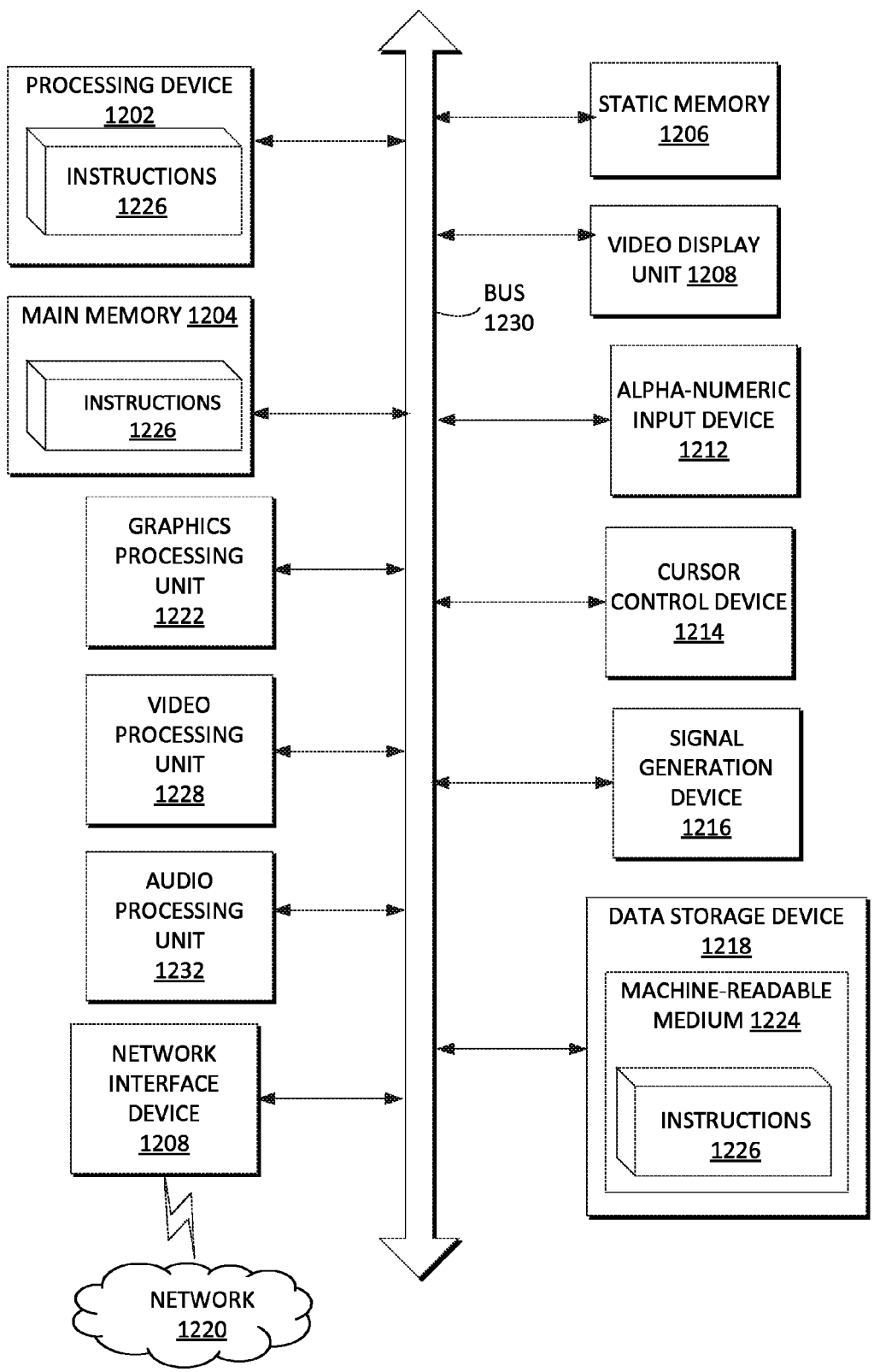
FIG. 12 illustrates another implementation of a block diagram for a computing system.

FIG. 12 illustrates a diagrammatic representation of a machine in the example form of a computing system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing system 1200 includes a processing device 1202, main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations discussed herein. In one embodiment, processing device 1202 can be part of the computing system 100 of FIG. 1. Alternatively, the computing system 1200 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1200 may further include a network interface device 1208 communicably coupled to a network 1220. The computing system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a signal generation device 1216 (e.g., a speaker), or other peripheral devices. Furthermore, computing system 1200 may include a graphics processing unit 1222, a video processing unit 1228 and an audio processing unit 1232. In another embodiment, the computing system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1218 may include a computer-readable storage medium 1224 on which is stored software 1226 embodying any one or more of the methodologies of functions described herein. The software 1226 may also reside, completely or at least partially, within the main memory 1204 as instructions 1226 and/or within the processing device 1202 as processing logic 1226 during execution thereof by the computing system 1200; the main memory 1204 and the processing device 1202 also constituting computer-readable storage media.

The computer-readable storage medium 1224 may also be used to store instructions 1226 utilizing the processing device 1202, such as described with respect to FIG. 1, and/or a software library containing methods that call the above applications. While the computer-readable storage medium 1224 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a processor comprising: 1) a requesting unit; 2) a first memory interface to couple to a far memory (FM); 3) a second memory interface to couple to a near memory (NM); and 4) a multi-level memory controller (MLMC) coupled to the requesting unit and the first memory interface and the second memory interface, wherein the MLMC is to: a) write data into a memory page of NM in response to a request from the requesting unit to retrieve the memory page from FM; b) receive a hint from the requesting unit, wherein the hint indicates that the data contained in the memory page of the NM is not to be subsequently requested by the requesting unit; c) when the hint indicates that the data contained in the memory page of the NM is not to be subsequently requested, clear a writeback bit for the memory page indicated in the hint; and d) start a writeback operation of a memory sector comprising the memory page and one or more additional memory pages, wherein the writeback operation is to transfer the data contained in the memory page from the NM to the FM when the writeback bit is set and the writeback operation does not transfer the data contained in the memory page from NM to the FM when the writeback bit is cleared.

In Example 2, the MLMC of Example 1 is to start the writeback operation in response to at least one of a write request or a read request from the requesting unit.

In Example 3, the MLMC of any one of Examples 1-2, is to start the writeback operation in response to a scrubbing operation of the memory page in NM.

In Example 4, the MLMC of any one of Examples 1-3, is to start the writeback operation in response to a management action triggered by the MLMC.

In Example 5, in the processor of any one of Examples 1-4, the requesting unit is to use a memory region comprising the memory page as a data buffer in which data is read, consumed and not is not to be subsequently requested.

In Example 6, the hint of any of Examples 1-5, is received as part of the request.

In Example 7, the MLMC of any of Examples 1-6, is to receive the hint as part of an asynchronous message from the requesting unit to the MLMC.

In Example 8, the hint of any of Examples 1-7, is included in a field in the asynchronous message.

In Example 9, the MLMC of any of Examples 1-8, is to receive the asynchronous message over at least one of a primary communication network between the requesting unit and the MLMC, a sideband channel between the requesting unit and the MLMC, or a datapath between the requesting unit and the MLMC In Example 10, the MLMC of any of Examples 1-9, is to receive the hint as part of an opcode.

In Example 11, in the processor of any of Examples 1-10, the requesting unit is at least one of a digital camera unit, a display system unit, or a modem baseband.

Various embodiments may have different combinations of the structural features described above. For instance, all optional features of the processor described above may also be implemented with respect to a system on chip (SoC) described herein and specifics in the examples may be used anywhere in one or more embodiments.

Example 12 is a system on chip (SoC) comprising: 1) a plurality of functional hardware units; 2) a first memory interface to couple to a far memory (FM); 3) a second memory interface to couple to a near memory (NM); and 4) a multi-level memory controller (MLMC) coupled to the plurality of functional hardware units and the first memory interface and the second memory interface, wherein the MLMC is to: a) write data into a memory page of NM in response to a request from a requesting unit of the plurality of functional hardware units to retrieve the memory page from FM; b) receive a hint from the requesting unit, wherein the hint indicates that the data contained in the memory page of the NM is not to be subsequently requested by the requesting unit; c) when the hint indicates that the data contained in the memory page of the NM is not to be subsequently requested, clear a writeback bit for the memory page indicated in the hint; and d) start a writeback operation of a memory sector comprising the memory page and one or more additional memory pages, wherein the writeback operation is to transfer the data contained in the memory page from the NM to the FM when the writeback bit is set and the writeback operation does not transfer the data contained in the memory page from NM to the FM when the writeback bit is cleared.

In Example 13, in the SoC of Example 12, the requesting unit is at least one of a digital camera unit or a display system unit.

In Example 14, the hint of any of Examples 12-13, is received as part of the request.

In Example 15, the MLMC of any of Examples 12-14, is to receive the hint as part of an asynchronous message from the requesting unit to the MLMC.

Various embodiments may have different combinations of the structural features described above. For instance, all optional features of the computing system described above may also be implemented with respect to the method or process described herein and specifics in the examples may be used anywhere in one or more embodiments.

Example 16 is a method comprising: 1) receiving, by a multi-level memory controller (MLMC), a request from a requesting unit to retrieve a memory page from far memory (FM); 2) writing the memory page into near memory (NM) in response to the request; 3) receiving a hint from the requesting unit, wherein the hint indicates that the data contained in the memory page of the NM is not to be subsequently requested by the requesting unit; 4) when the hint indicates that the data contained in the memory page of the NM is not to be subsequently requested, clearing a writeback bit for the memory page indicated in the hint; and 5) starting a writeback operation of a memory sector comprising the memory page and one or more additional memory pages, wherein the writeback operation is to transfer the data contained in the memory page from the NM to the FM when the writeback bit is set and the writeback operation does not transfer the data contained in the memory page from NM to the FM when the writeback bit is cleared.

In Example 17, in the method of Example 16, the starting the writeback operation comprises starting the writeback operation in response to at least one of a write request to a memory position of NM containing the memory page, a scrubbing operation of the memory page in NM, or a management action triggered by the MLMC.

In Example 18, in the method of any of Examples 16-17, the receiving the hint comprises receiving the hint as part of the request.

In Example 19, in the method of any of Examples 16-18, the receiving the hint comprises receiving the hint as part of an asynchronous message from the requesting unit to the MLMC.

In Example 20, in the method of any of Examples 16-19, the receiving the hint comprises receiving the hint as part of an opcode.

Various embodiments may have different combinations of the structural features described above. For instance, all optional features of the SoC described above may also be implemented with respect to a processor described herein and specifics in the examples may be used anywhere in one or more embodiments.

Example 21 is a processor comprising a system interconnect for a multi-level memory (MLM) architecture comprising near memory and far memory, wherein the near memory is a first-level random access memory (RAM) and the far memory is a second-level RAM, wherein the system interconnect comprises: 1) a near-memory controller to interface to a near-memory device of the near memory; 2) a far-memory controller to interface to a far-memory device of the far memory; and 3) a MLM controller (MLMC) coupled to the first near memory controller and the far-memory controller, wherein the MLMC is to: a) write data into a memory page of near memory in response to a read request from the requesting unit to retrieve the memory page from far memory; b) receive a hint from the requesting unit, wherein the hint indicates that the data contained in the memory page of the near memory is not to be subsequently requested by the requesting unit; c) when the hint indicates that the data contained in the memory page of the NM is not to be subsequently requested, clear a writeback bit for the memory page indicated in the hint; and d) start a writeback operation of a memory sector comprising the memory page and one or more additional memory pages, wherein the writeback operation is to transfer the data contained in the memory page from the near memory to the far memory when the writeback bit is set and the writeback operation does not transfer the data contained in the memory page from near memory to the far memory when the writeback bit is cleared.

In Example 22, the subject matter of Example 21, further comprises 4) a plurality of functional hardware units coupled to the MLMC; and 5) a system agent coupled between the plurality of functional hardware units and the MLMC.

In Example 23, in the subject matter of any of Examples 21-22, the near-memory controller comprises two memory channels, and wherein the far-memory controller comprises one memory channel.

Various embodiments may have different combinations of the operational features described above. For instance, all optional features of the method described above may also be implemented with respect to a non-transitory, computer-readable storage medium. Specifics in the examples may be used anywhere in one or more embodiments.

Example 24 is a non-transitory, computer-readable storage medium including instructions that, when executed by a processor, cause the processor to perform the method of Examples 16-20.

Example 25 is a system comprising a system on chip (SoC) comprising a plurality of functional units and a multi-level memory controller (MLMC) coupled to the plurality of functional units, wherein the MLMC is configured to perform the method of any of Examples 16-20.

In Example 26, the system of Example 25, the SoC further comprises the subject matter of any of Examples 1-15 and 21-23.

Example 27 is an apparatus comprising: a plurality of functional units of a processor; means for receiving a read request from a requesting unit of the plurality of functional units to retrieve a memory page from far memory (FM); means for writing the memory page into near memory (NM) in response to the read request; means for receiving a hint from the requesting unit, wherein the hint indicates that the data contained in the memory page of the NM is not to be subsequently requested by the requesting unit; means for clearing a writeback bit for the memory page indicated in the hint when the hint indicates that the data contained in the memory page of the NM is not to be subsequently requested; and means for starting a writeback operation of a memory sector comprising the memory page and one or more additional memory pages, wherein the writeback operation is to transfer the data contained in the memory page from the NM to the FM when the writeback bit is set and the writeback operation does not transfer the data contained in the memory page from NM to the FM when the writeback bit is cleared.

In Example 28, the apparatus of Example 27, further comprises the subject matter of any of Examples 1-12 and 21-23.

Example 29 is an apparatus comprising: a memory device and a processor comprising a multi-level memory controller (MLMC), wherein the processor is configured to perform the method of any of Examples 16-20.

In Example 30, the apparatus of Example 29, further comprises the subject matter of any of Examples 1-15 and 21-23.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A processor comprising:
a requesting unit;
a first memory interface to couple to a far memory (FM);
a second memory interface to couple to a near memory (NM); and
a multi-level memory controller (MLMC), coupled to the requesting unit, the first memory interface and the second memory interface, to:
write data into a memory page of NM in response to a request from the requesting unit to retrieve the memory page from FM;
receive a hint from the requesting unit, wherein the hint indicates whether the data contained in the memory page of the NM is not to be subsequently requested by the requesting unit;
when the hint indicates that the data contained in the memory page of the NM is not to be subsequently requested, clear a writeback bit for the memory page; and
start a writeback operation of a memory sector comprising the memory page and one or more additional memory pages, wherein the writeback operation is to transfer the data contained in the memory page from the NM to the FM when the writeback bit is set, and the writeback operation is not to transfer the data contained in the memory page from NM to the FM when the writeback bit is cleared.

2. The processor of claim 1, wherein the MLMC is to start the writeback operation in response to at least one of a write request or a read request from the requesting unit.

3. The processor of claim 1, wherein the MLMC is to start the writeback operation in response to a scrubbing operation of the memory page in NM.

4. The processor of claim 1, wherein the MLMC is to start the writeback operation in response to a management action triggered by the MLMC.

5. The processor of claim 1, wherein the requesting unit is to use a memory region comprising the memory page as a data buffer in which data is read, consumed and is not to be subsequently requested.

6. The processor of claim 1, wherein the hint is received as part of the request.

7. The processor of claim 1, wherein the MLMC is to receive the hint as part of an asynchronous message from the requesting unit to the MLMC.

8. The processor of claim 7, wherein the hint is included in a field in the asynchronous message.

9. The processor of claim 7, wherein the MLMC is to receive the asynchronous message over at least one of a primary communication network between the requesting unit and the MLMC, a sideband channel between the requesting unit and the MLMC, or a datapath between the requesting unit and the MLMC.

10. The processor of claim 1, wherein the MLMC is to receive the hint as part of an opcode.

11. The processor of claim 1, wherein the requesting unit is at least one of a digital camera unit or a display system unit.

12. A system on chip (SoC) comprising:
a plurality of functional hardware units;
a first memory interface to couple to a far memory (FM);
a second memory interface to couple to a near memory (NM); and
a multi-level memory controller (MLMC), coupled to the plurality of functional hardware units and the first memory interface and the second memory interface, to:
write data into a memory page of NM in response to a request from a requesting unit of the plurality of functional hardware units to retrieve the memory page from FM;
receive a hint from the requesting unit, wherein the hint indicates that the data contained in the memory page of the NM is not to be subsequently requested by the requesting unit;
when the hint indicates that the data contained in the memory page of the NM is not to be subsequently requested, clear a writeback bit for the memory page indicated in the hint; and
start a writeback operation of a memory sector comprising the memory page and one or more additional memory pages, wherein the writeback operation is to transfer the data contained in the memory page from the NM to the FM when the writeback bit is set and the writeback operation is not to transfer the data contained in the memory page from NM to the FM when the writeback bit is cleared.

13. The SoC of claim 12, wherein the requesting unit is at least one of a digital camera unit or a display system unit or a modem baseband.

14. The SoC of claim 12, wherein the hint is received as part of the request.

15. The SoC of claim 12, wherein the MLMC is to receive the hint as part of an asynchronous message from the requesting unit to the MLMC.

16. A method comprising:
receiving, by a multi-level memory controller (MLMC), a request from a requesting unit to retrieve a memory page from far memory (FM);
writing the memory page into near memory (NM) in response to the request;
receiving a hint from the requesting unit, wherein the hint indicates that data contained in the memory page of the NM is not to be subsequently requested by the requesting unit;
when the hint indicates that the data contained in the memory page of the NM is not to be subsequently requested, clearing a writeback bit for the memory page indicated in the hint; and
starting a writeback operation of a memory sector comprising the memory page and one or more additional memory pages, wherein the writeback operation is to transfer the data contained in the memory page from the NM to the FM when the writeback bit is set and the writeback operation is not to transfer the data contained in the memory page from NM to the FM when the writeback bit is cleared.

17. The method of claim 16, wherein the starting the writeback operation comprises starting the writeback operation in response to at least one of a write request to a memory position of NM containing the memory page, a scrubbing operation of the memory page in NM, or a management action triggered by the MLMC.

18. The method of claim 16, wherein the receiving the hint comprises receiving the hint as part of the request.

19. The method of claim 18, wherein the receiving the hint comprises receiving the hint as part of an asynchronous message from the requesting unit to the MLMC.

20. The method of claim 16, wherein the receiving the hint comprises receiving the hint as part of an opcode.

\* \* \* \* \*